(12) United States Patent
Di Fabbrizio et al.

(10) Patent No.: US 9,953,637 B1
(45) Date of Patent: Apr. 24, 2018

(54) SPEECH PROCESSING USING SKIP LISTS (71) Applicant: Amazon Technologies, Inc., Reno, NV (US)

(72) Inventors: Giuseppe Di Fabbrizio, Brookline, MA (US); Wei Chen, Cambridge, MA (US); Benjamin Edward Lambert, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 14/225,135

(22) Filed: Mar. 25, 2014

(51) Int. Cl.
  G10L 15/00 (2013.01)
  G10L 15/04 (2013.01)
  G10L 15/08 (2006.01)
(52) U.S. Cl.
  CPC .................................... G10L 15/08 (2013.01)
(58) Field of Classification Search
  USPC ......................................................... 704/254
  See application file for complete search history.

(56) References Cited

U.S. PATENT DOCUMENTS

| 2012/0296635 | A1* | 11/2012 | Brockett | G06F 17/2229 704/9 |
| 2012/0303371 | A1* | 11/2012 | Labsky | G10L 13/08 704/260 |
| 2015/0142420 | A1* | 5/2015 | Sarikaya et al. | 704/9 |

* cited by examiner

Primary Examiner — Kevin Ky
(74) Attorney, Agent, or Firm — Knobbe, Martens, Olson & Bear, LLP (57) ABSTRACT

Features are disclosed for processing user utterances and applying user-supplied corrections to future user utterances. If a user utterance is determined to relate to a speech processing error that occurred when processing a previous utterance, information about the error or a correction thereto may be stored. Such information may be referred to as correction information. Illustratively, the correction information may be stored in a skip list. Subsequent utterances may be processed based at least partly on the correction information. For example, speech processing results generated from processing subsequent utterances that include a term associated with the error may be removed or re-scored in order to reduce or prevent the chance that an error will be repeated.

22 Claims, 6 Drawing Sheets

SPEECH PROCESSING USING SKIP LISTS

BACKGROUND

Speech processing systems include various modules and components for receiving spoken input from a user and determining what the user meant. In some implementations, a speech processing system includes an automatic speech recognition ("ASR") module that receives audio input of a user utterance and generates one or more likely transcriptions of the utterance. ASR modules typically use an acoustic model and a language model. The acoustic model is used to generate hypotheses regarding which words or subword units (e.g., phonemes) correspond to an utterance based on the acoustic features of the utterance. The language model is used to determine which of the hypotheses generated using the acoustic model is the most likely transcription of the utterance based on lexical features of the language in which the utterance is spoken. Some language models are implemented as restrictive grammars, while others are implemented as less restrictive statistical language models. Utterances recognized using a grammar may be processed by downstream processes that take some action in response to the specific utterance recognized using the grammar, while utterances that deviate from those in the grammar are usually misrecognized or rejected.

Speech processing systems may also include a natural language understanding ("NLU") module that receives textual input, such as a transcription of a user utterance, and determines the meaning of the text in a way that can be acted upon, such as by a computer application. For example, an NLU module may be used to determining the meaning of text generated by an ASR module using a statistical language model. The NLU module can then determine the user's intent from the ASR output and provide the intent to some downstream process that performs some task responsive to the determined intent of the user (e.g., generate a command to initiate the phone call, initiate playback of requested music, provide requested information, etc.).

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to enhancing the ability of speech processing systems to accurately incorporate user-supplied corrections into utterance processing. Generally described, the accuracy of speech processing results depends on accurate transcription of a user utterance by an automatic speech recognition ("ASR") module or system, and accurate interpretation of user intent by a natural language understanding ("NLU") module or system. When an ASR module misrecognizes a word or phrase spoken by a user, the downstream consumers of ASR output may fail to respond appropriately to the user's utterance. When an NLU module misinterprets a word or phrase as having a different meaning than intended by the user, downstream consumers of NLU output may also fail to respond appropriately to the user's utterance. A user may correct a misrecognition or misinterpretation (collectively referred to herein as "misrecognition" for convenience) by repeating the misrecognized word or phrase, or by otherwise making another utterance related to the misrecognized word or phrase (e.g., "No, I said [misrecognized word]"). However, if the ASR or NLU module has already misrecognized a particular word or phrase, the probability may be unacceptably high that a subsequent utterance with the same word or phrase will be misrecognized, even if the subsequent utterance is made expressly to correct a prior misrecognition.

Aspects of the present disclosure relate to the creation and maintenance of lists of misrecognized speech processing items (e.g., words, phrases, intents, entities, etc.) so that the misrecognized items may be excluded from subsequent speech processing results. Such lists may be referred to as "skip lists." A speech processing system may add a previously recognized item to a skip list upon determining that a user has made a subsequent utterance correcting the previous recognition. The previously recognized item—which may have been misrecognized—can then be filtered from ASR and/or NLU results for one or more subsequent utterances. As a result, the speech processing system can avoid making the same misrecognition error in subsequent utterances, including those utterances that are made expressly to correct the misrecognition error. For example, if a user makes an utterance to set a timer, such as "set a timer for 13 minutes," an ASR module may misrecognize the utterance as a request to set a timer for "30 minutes." If the user subsequently says "no, I said set a timer for 13 minutes," a conventional ASR module may again misrecognize the utterance. However, a speech processing system implementing aspects of the present disclosure may determine that the subsequent utterance is a correction (e.g., based on the phrase "no, I said . . . ", because the utterance was made in response to a confirmation request by the speech processing system, etc.). The speech processing system can access the skip list and filter the previously misrecognized item from the ASR results generated during processing of the subsequent utterance. Accordingly, a different result may be returned, such as the next-best result from an n-best list of results (where n is some integer). Subsequent misrecognitions may also be added to the skip list, thereby reducing or eliminating the likelihood that the speech processing system will make the same misrecognition error in consecutive utterances, and improving the likelihood that the speech processing system will correctly recognize the utterance.

As used herein, the term "skip list" refers to any list or other collection of words, phrases, intents, entities, or other speech processing items that may have been misrecognized or misinterpreted during processing of a user utterance, or a list or collection of other information about misrecognition or misinterpretation of user utterances. Illustratively, a skip list may be a textual list, such as document stored on a disk and/or kept in memory of a computing device executing the processes described herein. In some embodiments, the skip list may be a data structure stored in memory, a binary representation of speech processing items, or any other collection that may be used to store words, phrases, intents, entities, or other speech processing items in a temporary, semi-permanent, or permanent fashion. In some embodiments, the skip list may be maintained for a single speech processing session, or for multiple (e.g., two or more) speech processing sessions, where a speech processing session includes one or more user utterances and corresponding speech processing system responses or other actions. In some embodiments, items in the skip list may be aged and purged after some predetermined or dynamically determined period of time, in response to some other event, etc. In some embodiments, the skip list may be referred to as an error list, an exclusion list, a modification list, etc., depending upon the specific implementation. For example, if recognition results that include skip list entries are to be removed, the skip list may be referred to as an exclusion list. As another example, if recognition results that include skip list entries are to be re-scored/re-ranked/demoted, the skip list may be referred to as a modification list.

Additional aspects of the present disclosure relate to the storage of semantic representations of speech processing items in a skip list, or otherwise to the use of semantic representations in maintaining a skip list. A skip list that stores only lexical representations of potentially misrecognized terms may not necessarily include all variations or alternatives for a misrecognized term. For example, if a speech processing system has misrecognized the term "tomorrow," then other variations of the term (e.g., the day of the week, such as "Wednesday," the day of the month, such as the "Mar. 5, 2014", etc.) may nevertheless be misrecognized in a subsequent utterance, effectively providing the same erroneous result. However, by storing the semantic representation of the term in the skip list, variations on the same term may be automatically excluded, such as when the skip list is applied to results generated by an NLU module (after a transcription has been interpreted into a semantic form, such as an intent and corresponding slot). As another example, the speech processing system may expand an erroneous semantic representation into its associated lexical representations (e.g., "tomorrow" may be expanded to include "Wednesday," "March $5^{th}$, 2014," etc.). A skip list with such expanded representations may be applied to results generated by an ASR module (e.g., prior to interpretation, entity recognition, slot filling, etc. by an NLU module).

Further aspects of the present disclosure relate to demoting, re-scoring, or otherwise re-ranking ASR or NLU results based on skip list entries, rather than filtering out items present in the skip list. Demoting a speech processing result that includes an item in the skip list, rather than removing the result altogether, can help to reduce or prevent the chance that the speech processing system has misrecognized a user correction for a particular item, which would otherwise prevent proper recognition of the item. For example, if a user makes an utterance to set a time for a given period of time, and then makes a subsequent utterance about some unrelated task or query that also happens to include the same number or time, the speech processing system may misrecognize the utterance when using the skip list. However, by merely demoting or rescoring results, the correct result may be maintained in an n-best list of results, and may therefore be recognized correctly. In some embodiments, the demotion/re-scoring/re-ranking applied to an item in a skip list may change over the course of time, such based on how long the item has been in the skip list, how many utterances have been processed since the item was added to the skip list, etc.

Although aspects of the embodiments described in the disclosure will focus, for the purpose of illustration, on a speech processing system that maintains and uses skip lists for a single or limited number of speech processing sessions, one skilled in the art will appreciate that the techniques disclosed herein may be applied to any number of software processes or applications performing speech processing. For example, a user may be associated with a personal skip list that persists for some predetermined period of time or indefinitely. Various aspects of the disclosure will now be described with regard to certain examples and embodiments, which are intended to illustrate but not limit the disclosure.

Examples of Speech Processing Systems with Skip Lists

Figure 1:
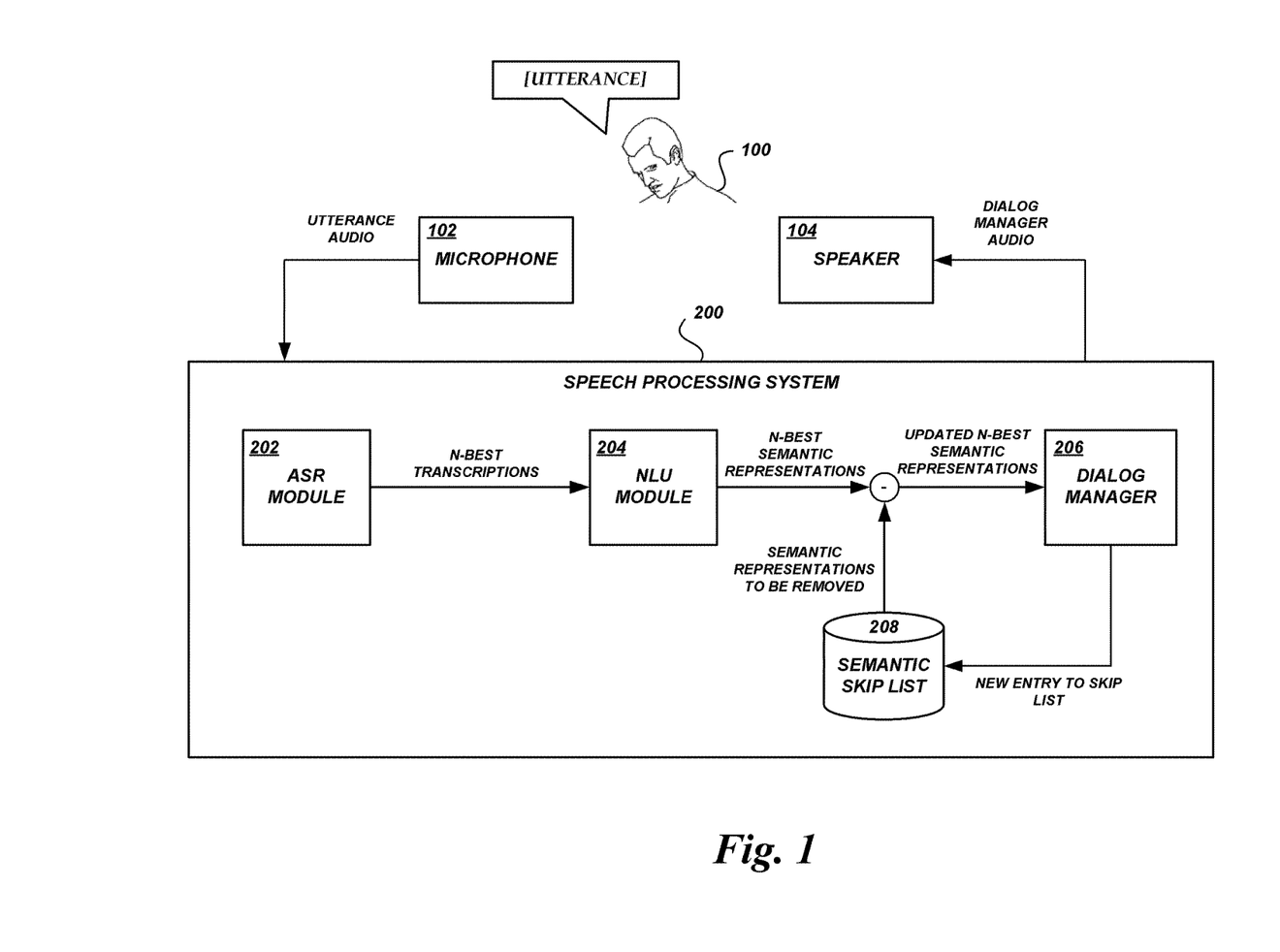
FIG. 1 is a block diagram of illustrative data flows between modules of a speech processing system during utterance processing using a skip list after NLU processing.
Figure 5:
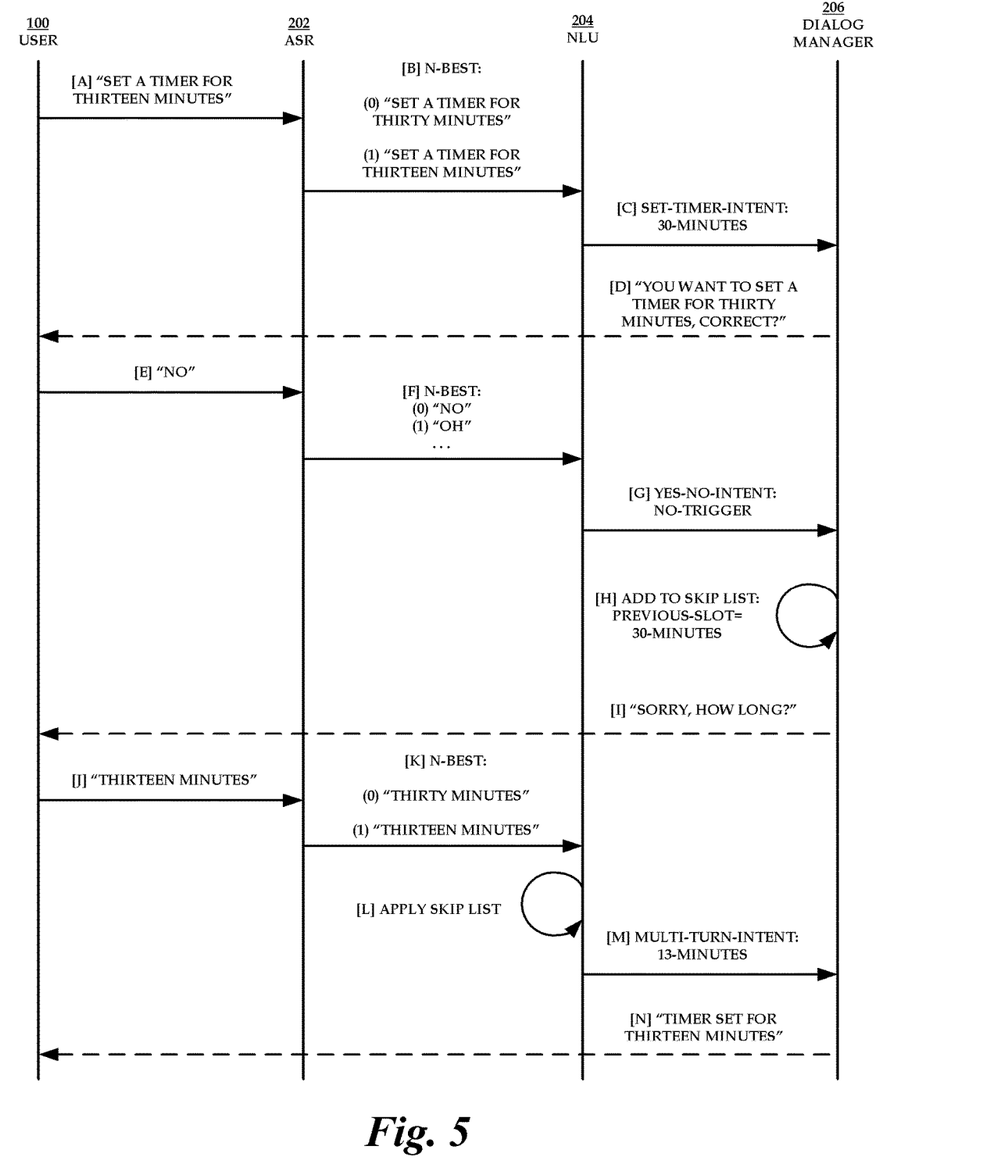
FIG. 5 is a diagram of illustrative data flows between a user and modules of a speech processing system during utterance processing using a skip list.
Figure 6:
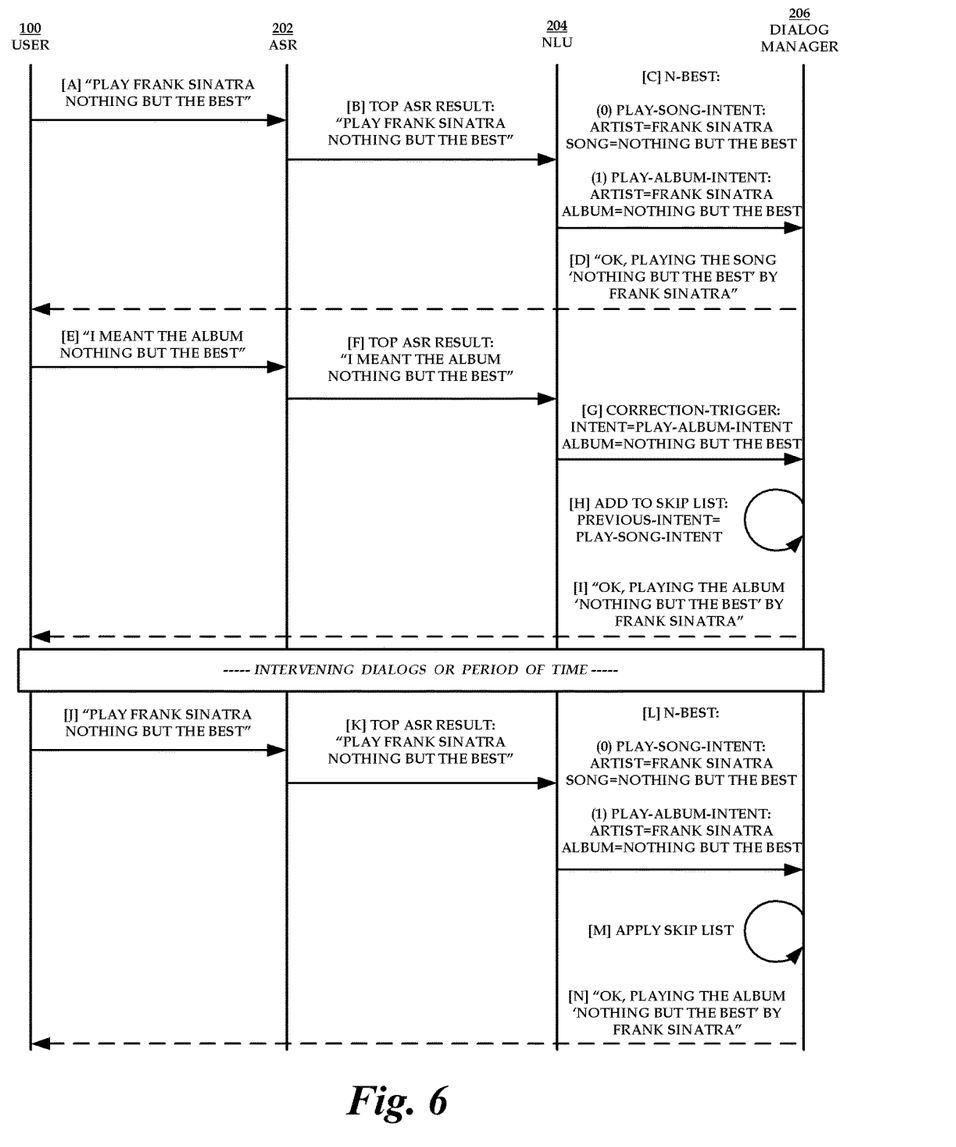
FIG. 6 is a diagram of additional illustrative data flows between a user and modules of a speech processing system during utterance processing using a skip list.

With reference to an illustrative embodiment, FIG. 1 shows a speech processing system that may implement aspects of the present disclosure. In particular, FIG. 1 shows example data flows between various speech and language processing modules in response to receipt of user utterances. A user 100 may make an utterance, such as an utterance that includes a spoken command for a computing system to perform some task. In one specific non-limiting example, as shown in FIG. 5, the user 100 may say "Set a timer for thirteen minutes." In another specific non-limiting example, as shown in FIG. 6, the user 100 may say "Play Some Frank Sinatra Nothing But The Best." The user 100 may speak the utterance into (or in the presence of) some client device operated by the user.

The client device can correspond to a wide variety of electronic devices. In some embodiments, the client device may be a computing device that includes one or more processors and a memory which may contain software applications executed by the processors. The client device may include or be in communication with an audio input component for accepting speech input on which to perform speech recognition, such as a microphone 102. The client device may also include or be in communication with an output component for presenting responses or other information from the speech processing system 200, such as a speaker 104. The software of the client device may include hardware components and/or software for establishing communications over wireless communication networks or directly with other computing devices. Illustratively, the client device may be a mobile device, such as a mobile phone, personal digital assistant ("PDA"), mobile gaming device, media player, electronic book reader, tablet computer, laptop computer, or the like. In some embodiments, the client device may be a substantially stationary device, such as a television with program execution capabilities and network connectivity (a "smart TV"), set-top box, gaming console, home entertainment system, desktop computer, server computer, or the like.

As shown in FIG. 1, user utterances may be provided to a speech processing system 200. The speech processing system 200 can be a network-accessible system in communication with the client device via a communication network, such as a cellular telephone network or the Internet. A user may use the client device to submit utterances, receive information, and initiate various processes, either on the client device or at the speech processing system 200. For example, the user can issue spoken commands to the client device in order to set timers, listen to music, etc.

The speech processing system 200 may include an ASR module 202 that performs automatic speech recognition on audio data regarding user utterances, an NLU module 204 that performs natural language understanding on transcriptions generated by the ASR module 202, a dialog manager 206 that manages user interaction with the speech processing system 200 (e.g., multi-turn dialog management), and a skip list 208 that stores items to be filtered from (or demoted within) the results of one or more modules or components of the speech processing system 200.

The speech processing system 200 may include any number of server computing devices, desktop computing devices, mainframe computers, and the like. Each individual device may implement one of the modules or components of the speech processing system 200. In some embodiments, the speech processing system 200 can include several devices physically or logically grouped together to implement one of the modules or components of the speech processing system 200. For example, the speech processing system 200 can include various modules and components combined on a single device, multiple instances of a single module or component, etc. In one specific, non-limiting embodiment, the speech processing system 200 may include a server or group of servers configured with ASR and/or NLU modules 202, 204, a server or group of servers configured with a dialog manager 206, etc. In multi-device implementations, the various devices of the speech processing system 200 may communicate via an internal communication network, such as a corporate or university network configured as a local area network ("LAN") or a wide area network ("WAN"). In some cases, the devices of the speech processing system 200 may communicate over an external network, such as the Internet, or a combination of internal and external networks.

In some embodiments, the features and services provided by the speech processing system 200 may be implemented as web services consumable via a communication network. In further embodiments, the speech processing system 200 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the features of the speech processing system 200 may be integrated into the client device such that network connection and one or more separate computing systems are not necessary to perform the processes of the present disclosure. For example, a single client device may include the microphone 102, the ASR module 202, the NLU module 204, the dialog manager 206, the skip list 208, or some combination thereof.

Returning to the examples described above and in greater detail below, users may submit utterances that may include various commands, requests, and the like. The microphone 102 may capture utterance audio and provide it (or data derived therefrom) to the speech processing system 200. The ASR module 202 may generate ASR results for the utterance, such as an n-best list of transcriptions. Each transcription or portion thereof may be associated with some score, such as a confidence score or a likelihood that the transcription or portion thereof is correct. The n-best list or some other type of results may be provided to the NLU module 204 so that the user's intent may be determined. An n-best list of intents may be determined or generated by the NLU module 202 and provided to the dialog manager 206. The dialog manager 206 may then initiate some action or generate some response to the user's utterance. Illustratively, based on the top-ranked result of the n-best list, the dialog manager 206 may generate audio that is output via the speaker 104 of the client device.

In some embodiments, if the top-ranked result fails to meet or exceed some threshold (e.g., if a score associated with the top-ranked result is too low), the dialog manager 206 may generate a confirmation or verification communication. For example, the user may be asked to confirm the accuracy of the determined intent. If the user makes a correction, the dialog manager 206 can add the misrecognized results (or data regarding the misrecognized results) to the skip list 208. In some embodiments, the user may correct a recognition error even in the absence of a conformation communication from the speech processing system 200. The dialog manager 206 may also add the misrecognized results (of data regarding the misrecognized results) to the skip list 208 in such cases, as described in greater detail below. Subsequent utterances may then be processed using the skip list 208 so that recognition errors are not repeated.

Generally described, the dialog manager 206 may coordinate interaction of the user 100 with the speech processing system 200. A sequence of interactions between a user 100 and a speech processing system 200 may be referred to as a multi-turn dialog, or more generally as a dialog. A dialog typically includes multiple (e.g., two or more) communications between the user 100 and the speech processing system 200 related to some particular subject, such as a command, query, or task. For example, if a user is booking airline tickets, the back-and-forth communications between the user 100 and speech processing system 200 to determine departure and return dates, search for flights, and initiate booking may be managed by a dialog manager 206 as a single dialog or as a collection of several dialogs (e.g., a first dialog for proving desired departure dates, a second dialog for searching flights, etc.). As another example, a spoken command by a user to set a timer may be a dialog. The user may make an utterance including the spoken command to set the timer, and the speech processing system 200 may respond with questions for additional information or requests for clarification, confirmation of successful competition of the task, etc.

Dialog managers 206 typically maintain some state information over the course of a dialog, such as the dialog history, the latest unanswered question, etc., depending on the system implementation or specific dialog being managed. For example, a first user utterance may be recognized to relate to a particular intent and a particular slot value. The dialog manager 206 may store information regarding the recognized intent, slot, and/or other processing results. Accordingly, when a user makes a subsequent utterance that relates to a term (e.g., intent or slot) in a previous utterance, or which builds upon information obtained in a previous utterance (e.g., previously received departure dates for flight searching), the dialog manager 206 can access state information regarding the previous utterance in order to a better user experience. In some embodiments, the state information may be accessed by or made available to the ASR module 202 and/or the NLU module 204.

In the case of an ASR misrecognition or an NLU semantic interpretation error, a user may reply by correcting an erroneous value in one or more steps. Based on the user's input, it may be possible to identify the target of the user's correction (e.g., an intent or a slot associated with an intent as determined during processing of a previous utterance) and dynamically create a skip list 208 that reflects invalid entries in a specific dialog context. The skip list 208 can be used to discard invalid entries from future n-best hypotheses from either ASR recognitions or NLU interpretations. Properly managed skip lists 208 avoid repeated misunderstandings and provide a better user experience.

As shown in FIG. 1, the skip list 208 may be a semantic skip list. Entries in the semantic skip list 208 may be slots or intents determined by the NLU module 204. For example, if the misrecognized term was "tomorrow," a semantic representation of the term may be stored in the skip list 208. The semantic representation may be used to filter (or re-score) not only the literal "tomorrow," but also equivalents such as the day of the week, the day of the month, and the like. When a user subsequently makes an utterance that is processed by the ASR module 202 and NLU module 204, semantic representations that correspond to those in the skip list 208 may be filtered from the n-best list of semantic representations from the NLU module 204 to produce an updated n-best list of semantic representations. The updated n-best list may then be provided to the dialog manager 206. In some embodiments, the dialog manager performs the filtering of NLU n-best lists. In additional embodiments, a separate component may perform the filtering.

Figure 2:
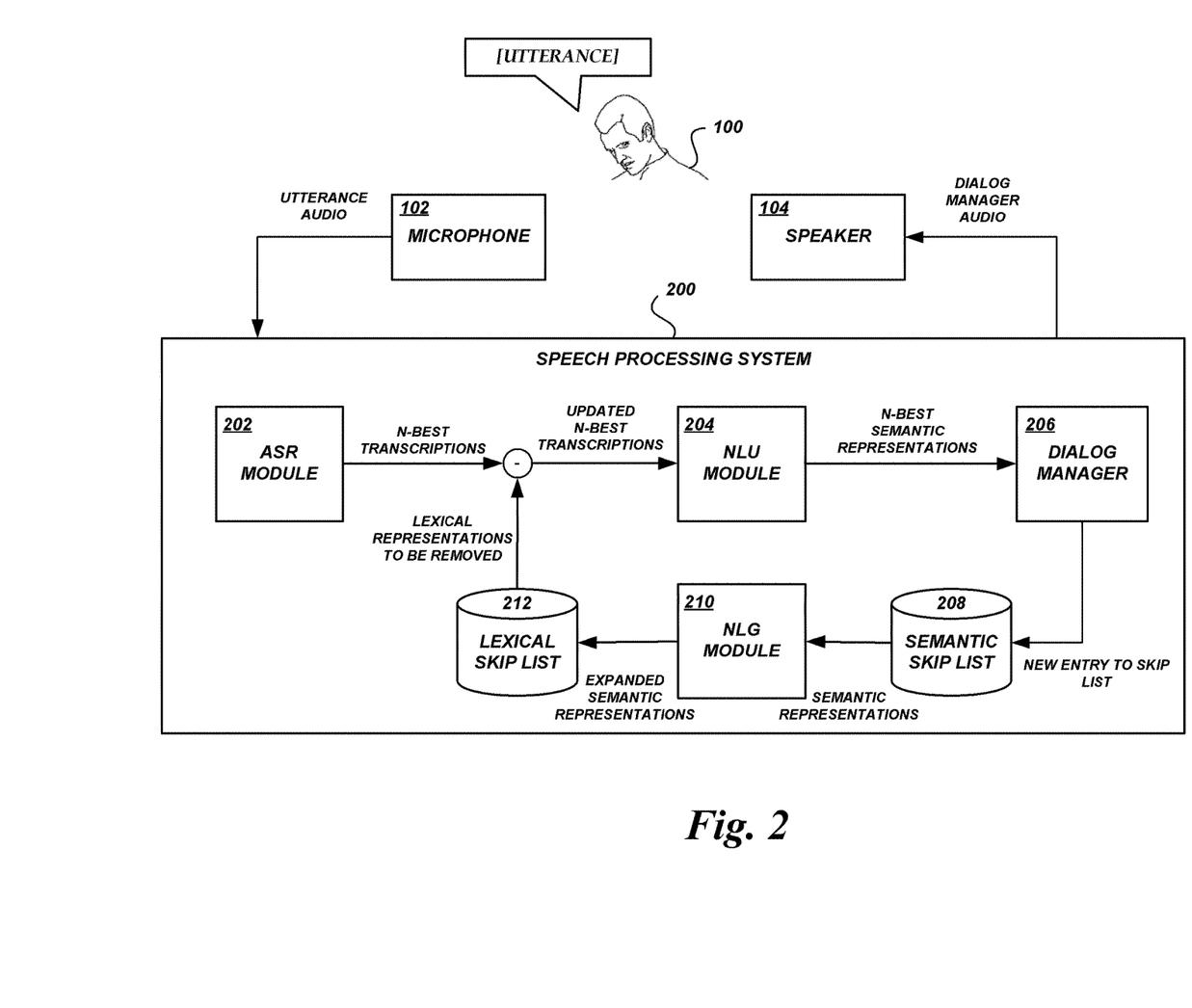
FIG. 2 is a block diagram of illustrative data flows between modules of a speech processing system during utterance processing using a skip list after ASR processing.

FIG. 2 shows another embodiment of a speech processing system 200. Rather than using semantic representations of previously recognized speech processing items to filter output from the NLU module 204 as described above with respect to FIG. 1, the speech processing system 200 shown in FIG. 2 may filter output from the ASR module 202 using semantic representations expended into one or more lexical representations.

Output from the ASR module 202 may generally be in the form of lexical representations of user utterances, such as an n-best list of transcriptions. If a literal match of a skip list item (e.g., a word, phrase, intent, slot, or other speech processing item) is not made in a transcription, then the transcription may not be filtered or demoted. This may be the case even if the transcription should be filtered or demoted. For example, a timer incorrectly set for "30 minutes" is also set incorrectly if set for "½ hour." If the literal "30 minutes" is in the skip list but the equivalent literal "½ hour" is not, then the ASR results may not be filtered properly. In order to properly filter out multiple lexical representations of a semantic skip list item, an expanded lexical skip list 212 may be maintained. Items may be added to a semantic skip list 208 as described above and in greater detail below. However, rather than relying only upon those semantic representations of misrecognized speech processing items, a natural language generation ("NLG") module 210 (or some other module or component) may expand the semantic representations into their various lexical representations for use in filtering ASR results. ASR results that include matches to lexical representations (e.g., identified using regular expressions or other textual/pattern matching techniques) can then be filtered from, or demoted with, the ASR results.

Returning the previous example, if the semantic representation "30 minutes" is in the semantic skip list 208, then multiple lexical representations may be included in the lexical skip list 212, including "30 minutes," "½ hour," specific times such as 30 minutes from the present time, etc. In this way, a misrecognized speech processing item may be properly filtered from ASR results regardless of which lexical or literal form it takes in the ASR results. Updated ASR results, such as an n-best list of transcriptions that exclude transcriptions comprising skip list items, may be provided to the NLU module 204.

In some embodiments, a lookup or cross-reference database may be used instead of an NLG module 210 (or such a database may be used by the NLG module 210) to expand the semantic representations into lexical representations. In some embodiments, the expansion of semantic skip list representations to lexical representations for storage in the lexical skip list 212 may be performed by the dialog manager 206 or some other module or component of the speech processing system 200. In some embodiments, a separate semantic skip list 208 may not be maintained. Instead, speech processing items to be added to the skip list may be expanded into one or more lexical representations and stored only in a lexical skip list 212.

Figure 3:
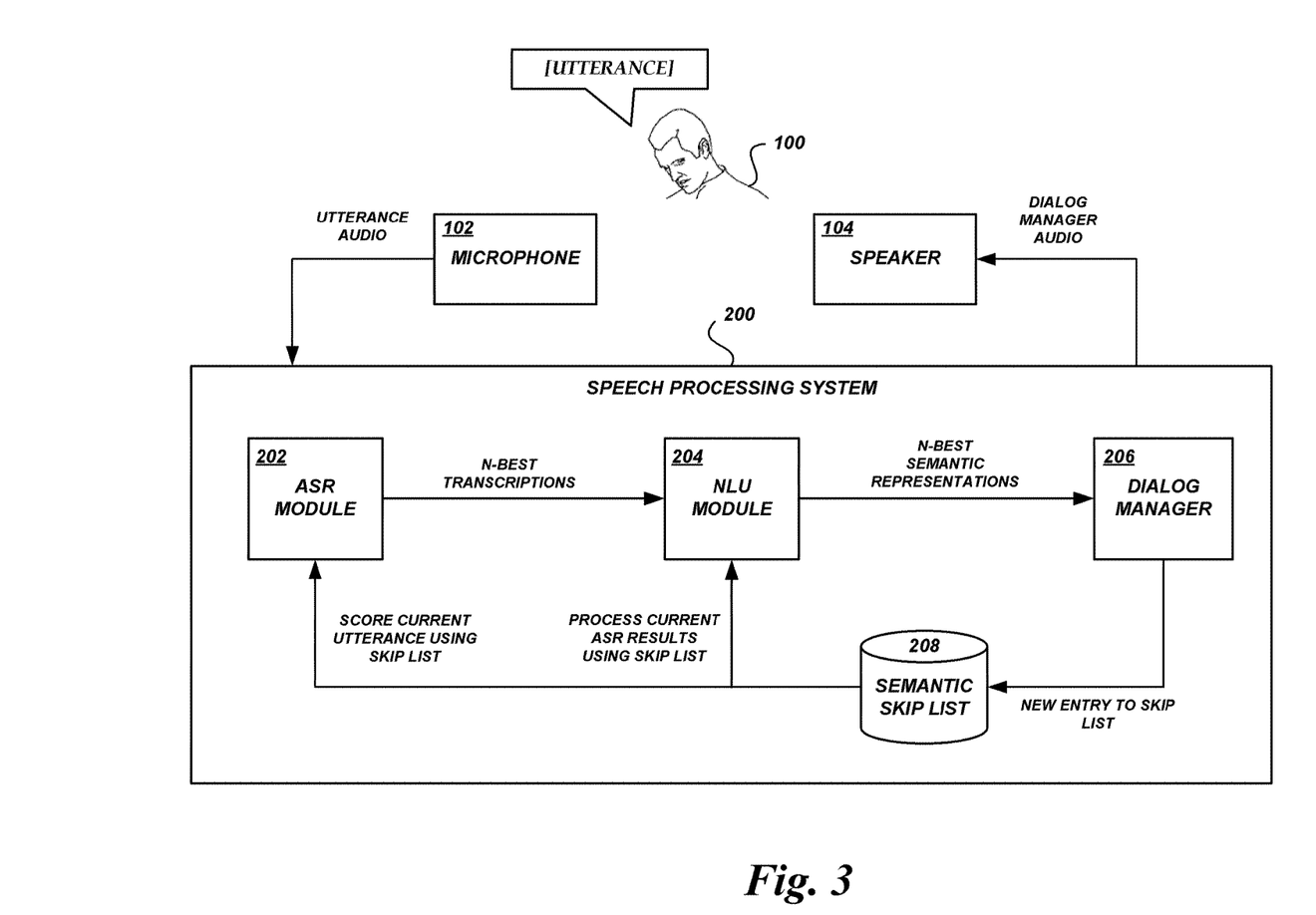
FIG. 3 is a block diagram of illustrative data flows between modules of a speech processing system during utterance processing using a skip list during ASR and/or NLU processing.

FIG. 3 shows another embodiment of a speech processing system 200. Rather than using lexical or semantic representations of previously recognized speech processing items to filter output from the ASR module 202 or NLU module 204 as described above with respect to FIGS. 1 and 2, the speech processing system 200 shown in FIG. 3 may use the skip list 208 during ASR or NLU processing. The ASR module 202 and/or NLU module 204 may use skip list entries during decoding, such as by restricting a search space to exclude skip list items, by rescoring or re-ranking results based at least partly on skip list entries, etc. In this way, the ASR and/or NLU modules 202, 204 can use the skip list directly, rather than producing results that are then filtered based on the skip list in a separate post-processing step. For example, the ASR module 202 may re-score preliminary ASR results based on the presence or absence of various words or phrases in the skip list. The results produced by the ASR module 202 may then properly exclude skip list items, or properly reflect an n-best ranking based on the presence of items in the skip list. This can reduce or eliminate the need for a separate post-ASR-processing step. As another example, the NLU module 204 may consult the skip list when performing named entity recognition, intent classification, and the like. The results produced by the NLU module 204 may then properly exclude skip list items, or properly reflect an n-best ranking based the presence of items in the skip list. This can reduce or eliminate the need for a separate post-NLU-processing step.

In some embodiments, skip list entries (or other information about misrecognized or misinterpreted speech processing items) may be used to adjust weights for models used by the ASR and/or NLU modules 202, 204. For example, the skip list entries may be used in an online learning processes whereby weights for a model are dynamically updated to account for the misrecognition of a word such that the models will produce more accurate results in future processing. As another example, skip list information may be used in an offline process to train new models (or re-train existing models) for use in future speech processing.

Process for Managing and Using Skip Lists

Figure 4:
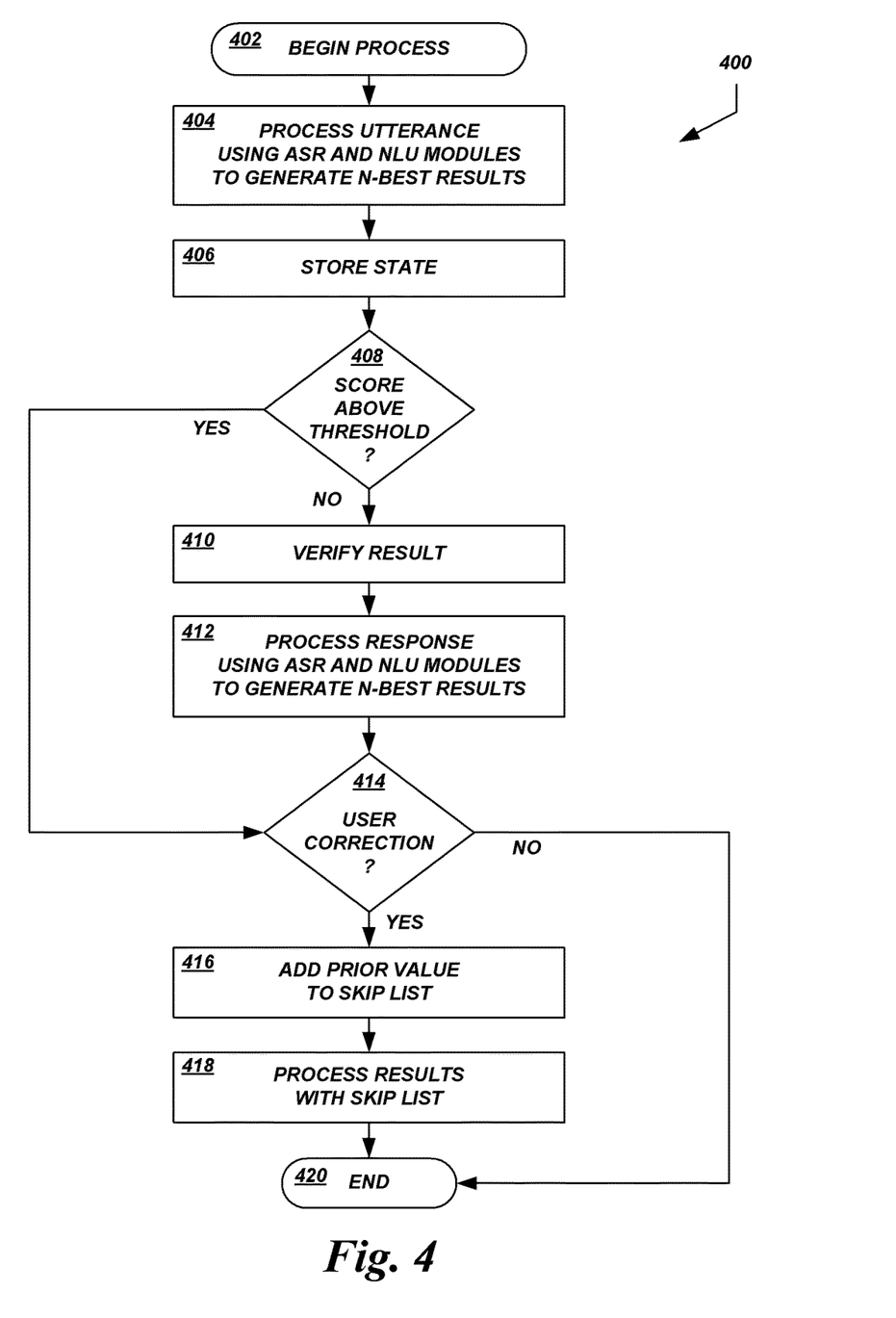
FIG. 4 is a flow diagram of an illustrative process for processing an utterance using a skip list.

With reference now to FIG. 4, a sample process 400 for processing a user utterance using a skip list will be described. Advantageously, a dialog manager 206 or some other module or component of a speech processing system 200 performing the process 400 can filter out (or demote) previously misrecognized speech processing items from subsequent utterances, thereby improving recognition accuracy and improving the overall user experience. Such filtering may be particularly useful when processing a user utterance made expressly to correct a recognition error.

The process 400 begins at block 402. The process 400 may begin automatically upon initiation of a speech recognition session or receipt of input data (e.g., audio data regarding a user utterance). The process 400 may be embodied in a set of executable program instructions stored on a computer-readable medium, such as one or more disk drives, of a computing system of the speech processing system 200. When the process 400 is initiated, the executable program instructions can be loaded into memory, such as RAM, and executed by one or more processors of the computing system.

At block 404, the speech processing system 200 can process the utterance using ASR and NLU modules 202, 204 to generate results. The results may be in the form of an n-best list, a single top-scoring result, or some other results known to those of skill in the art. FIG. 5 shows one example of a user utterance. At [A], a user 100 may have said "Set a timer for thirteen minutes." At [B], the ASR module 202 may generate an n-best list of results, including "Set a timer for thirty minutes" as the top-scoring result. This top-scoring result includes a misrecognition of "thirteen" as "thirty." At [C], the NLU module 204 may then interpret the top-scoring ASR result as a request to set a timer for 30 minutes (e.g., a "SET-TIMER-INTENT" with a slot value of "30-MINUTES").

At block 406, the dialog manager 206 or some other module or component of the speech processing system 200 may store state information about the dialog, as described above. For example, the dialog manager 206 may store the intent (e.g., "SET-TIMER-INTENT") and/or slot value ("30-MINUTES").

At decision block 408, the dialog manager 206 or some other module or component of the speech processing system 200 can determine whether the determined results meet or exceed some minimum threshold. For example, each recognition result generated by the ASR module 202 and/or NLU module 204 may be associated with some score, such as a confidence score or a representation of a likelihood that the result is correct. If the top-scoring result meets or exceeds the threshold, the process 400 may proceed to decision block 414. However, if the top-scoring result does not exceed the threshold, the process 400 may proceed to block 410.

At block 410, the dialog manager 206 or some other module or component of the speech processing system 200 may initiate a verification communication to the user 100. In the present example, the dialog manager may generate a communication at [D], verifying that the user 100 wants to "set a timer for thirty minutes."

At block 412, the speech processing system 200 may receive a response utterance from the user, and may process the response similar to the processing described above to generate results. In the present example, the user 100 may respond to the verification communication by saying "No" at [E]. At [F], the ASR module 202 may generate ASR results, which may then be processed by the NLU module 204 at [G] as a trigger that the previous recognition was incorrect.

At decision block 414, the dialog manager 206 or some other module or component of the speech processing system 200 can determine whether a user correction has been received. If no user correction has been received, the process 400 may terminate at block 420. Otherwise, the process may proceed to block 413. In the present example, the NLU results correspond to a user indication that there was an error in the previous recognition.

At block 416, the dialog manager 206 or some other module or component of the speech processing system 200 can add the previously recognized value to the skip list. Illustratively, the skip list may be used to store only misrecognized slot values. In the present example, the slot value of "30-MINUTES" may be added to the skip list at [H].

As shown in FIG. 5, the dialog manager 206 may prompt the user for a new value for the slot at [I]. The user 100 response received at [J] may be processed by the ASR module 202 at [K]. Because the response includes the term that was misrecognized previously, there is an increased likelihood that the same recognition error will be encountered again at [K]. This may be because the same user is saying the same words in the same way from one utterance to the next. Other factors may also influence the repeat recognition error, including environmental noise that has not stopped from one utterance to the next, poor audio quality attributable to the microphone or network connection, etc.

At block 418, dialog manager 206 or some other module or component of the speech processing system 200 can process the result with the skip list in order to reduce or prevent a repeat of the previous misrecognition error. As shown in FIG. 5, the skip list may be applied to the ASR results at [L], filtering out the top-ranked result of "thirty minutes." The intent determined by the NLU module 204 at [M] may therefore be based on the second-best result of the ASR n-best list, which is nevertheless the correct result.

In some embodiments, the process 400 may be used to correct misinterpreted intents instead of, or in addition to, misinterpreted slot values. In additional embodiments, skip list values may be retained for multiple dialogs or for some period of time, thereby providing a potential improvement in accuracy when processing later, potentially unrelated utterances.

FIG. 6 shows an example of speech processing system 200 processing using a skip list that includes misrecognized user intents. A user has made an utterance at [A] requesting playback of "Frank Sinatra Nothing But The Best." The ASR module 202 can produce ASR results at [B], which may include a correct transcription of the user's utterance as the top result. Note that the musical artist Frank Sinatra has recorded a song titled "Nothing But The Best." In addition, a collection of Frank Sinatra's work has been released in an album named "Nothing But The Best." Because of this ambiguity, the user utterance may be incorrectly interpreted by the NLU module 204 at [C] as a "PLAY-SONG" intent with slot values of "ARTIST=FRANK SINATRA" and "SONG=NOTHING BUT THE BEST." The speech processing system 200 may make a confirmation communication at [D]. The conformation communication may be a standard confirmation of recognition success, or it may serve as an implicit verification.

At [E], the user 100 has stated "I meant the album Nothing But The Best" rather than the song. The speech processing system 200 may process the utterance at [F] and [G], determining that the user is correcting a misrecognition. The determination may be made based on the phrase "I meant," based on the presence of the word "album" in an utterance following a confirmation of a "PLAY-SONG" intent, or based on some other information or determination. At [H], the misrecognized intent may be added to the skip list. At [I], the dialog manager 206 can initiate a notification dialog regarding the corrected interpretation.

Subsequently, after some number of intervening dialogs or after some period of time, the user may make an utterance at [J] indicating an intent to again hear "Frank Sinatra Nothing But The Best." As shown, the ASR module 202 may again correctly recognize the user utterance at [K], while the NLU module 204 may again generate NLU results with the incorrect "PLAY-SONG-INTENT" as the top result at [L] However, due to the presence of the misrecognized intent in the skip list (and, in some embodiments, data indicating the intent was misrecognized specifically in connection with Frank Sinatra and/or Nothing But The Best), the speech processing system 200 may correctly interpret the user utterance as a "PLAY-ALBUM-INTENT" at [M] and [N].

The examples shown in FIGS. 5 and 6 are illustrative only, and are not intended to be limiting. The process 400 may be used to apply skip-list processing to any user-corrected or otherwise erroneous recognition or interpretation of a speech processing system. In some embodiments, the NLU module 204 may misrecognize named entities instead of, or in addition to, user intents, and the process 400 may be used to add those misrecognized named entities to a skip list to improve the accuracy of future processing. For example, a user may say "Give me directions to Lebanon" in order to get direction to the city Lebanon, Ohio. The NLU module 204 (or some other module or component of a speech processing system 200) may misrecognize the word "Lebanon" in a user utterance as a named entity of type "COUNTRY" (referring to the country bordering the Mediterranean Sea) rather than a named entity of type "CITY." The process 400 may be used to receive user correction or other feedback regarding the misrecognized named entity, add the misrecognized named entity to a skip list, and then process a subsequent user utterance with the skip list to reduce the likelihood that the same recognition error will be repeated (thereby increasing the likelihood that the correct named entity will be recognized).

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for executing an action based on an utterance, the system comprising:
   a computer-readable memory storing executable instructions; and
   one or more processors in communication with the computer-readable memory, wherein the one or more processors are programmed by the executable instructions to at least:
   obtain first audio data regarding a first utterance of a user;
   generate first speech processing results based at least partly on the first audio data, the first speech processing results comprising a first semantic representation of at least a portion of the first utterance;
   generate a response for presentation to the user, the response related to the first semantic representation;
   obtain second audio data regarding a second utterance of the user;
   generate second speech processing results based at least partly on the second audio data;
   determine, based at least partly on the second speech processing results, that the second utterance relates to an error in the first speech processing results, wherein the first semantic representation is associated with the error;
   generate, using the first semantic representation, a plurality of textual representations, wherein individual textual representations of the plurality of textual representations are associated with a meaning corresponding to the first semantic representation;
   add an entry to an error list separate from the first speech processing results and the second speech processing results, wherein the entry indicates the plurality of textual representations are erroneous;
   generate, subsequent to adding the entry to the error list and prior to obtaining third audio data regarding a third utterance of the user, speech processing results for a plurality of intervening utterances of the user;
   obtain the third audio data regarding the third utterance of the user;
   generate third speech processing results based at least partly on the third audio data, wherein the third speech processing results comprise a first speech processing hypothesis and a second speech processing hypothesis, wherein the first speech processing hypothesis is associated with a first executable action, and wherein the second speech processing hypothesis is associated with a second executable action distinct from the first executable action;
   determine, using the error list, that at least a portion of the first speech processing hypothesis corresponds to a textual representation of the plurality of textual representations;
   remove the first speech processing hypothesis from the third speech processing results based at least partly on the portion of the first speech processing hypothesis corresponding to the textual representation; and
   execute the second executable action instead of the first executable action based at least partly on the second speech processing hypothesis remaining in the third speech processing results after the first speech processing hypothesis is removed.

2. The system of claim 1, wherein the error comprises one of: an automatic speech recognition misrecognition, or a natural language understanding misinterpretation.

3. The system of claim 1, wherein the instructions to add the entry to the error list comprise instructions to perform natural language generation using the first semantic representation to generate the plurality of textual representations of the first semantic representation.

4. The system of claim 1, wherein the instructions to determine that at least the portion of the speech processing hypothesis corresponds to the entry in the error list comprise instructions to:
   compare at least a portion of the plurality of speech processing hypotheses to at least a portion of entries in the error list; and
   determine that at least the portion of the speech processing hypothesis is equal to at least a portion of the entry in the error list.

5. A computer-implemented method for executing an action based on audio data, the computer-implemented method comprising:
   under control of one or more computing devices configured with specific computer-executable instructions,
   generating first speech processing results comprising a first semantic representation of at least a portion of a first user utterance, the first speech processing results generated using a speech processing system and audio data regarding at least the portion of the first user utterance;
   determining that a second semantic representation of at least a portion of a second user utterance relates to a correction to the first semantic representation;
   generating, using the first semantic representation, one or more lexical representations associated with a meaning corresponding to the first semantic representation;
   storing correction information in an error list separate from the first speech processing results and separate from second speech processing results comprising the second semantic representation, wherein the correction information indicates that the one or more lexical representations are erroneous;
   determining, using the correction information, that at least a portion of a first speech processing hypothesis, of a plurality of speech processing hypotheses for a third user utterance, corresponds to a lexical representation of the one or more lexical representations;
   removing the first speech processing hypothesis from the plurality of speech processing hypotheses based at least partly on the determining that at least the portion of the first speech processing hypothesis corresponds to the lexical representation;

generating a third semantic representation of at least a portion of the third user utterance using a second speech processing hypothesis of the plurality of speech processing hypotheses instead of the first speech processing hypothesis based at least partly on the second speech processing hypothesis remaining in the plurality of speech processing hypotheses after the first speech processing hypothesis is removed, wherein the first speech processing hypothesis is associated with a first executable action, and wherein the second speech processing hypotheses is associated with a second executable action distinct from the first executable action; and executing the second executable action.

6. The computer-implemented method of claim 5, wherein the correction information comprises at least a portion of the first semantic representation.

7. The computer-implemented method of claim 5, wherein the correction information comprises information regarding one of: an intent or a slot value.

8. The computer-implemented method of claim 5, wherein the first speech processing hypothesis comprises the first semantic representation.

9. The computer-implemented method of claim 8, further comprising modifying a score associated with the first speech processing hypothesis in the plurality of speech processing hypotheses.

10. The computer-implemented method of claim 5, further comprising modifying at least one of an automatic speech recognition model or a natural language understanding model based at least partly on the correction information.

11. The computer-implemented method of claim 5, wherein the correction relates to one of: an automatic speech recognition misrecognition, or a natural language understanding misinterpretation.

12. The computer-implemented method of claim 5, wherein the generating the one or more lexical representations comprises expanding, using a natural language generation component, the first semantic representation into the one or more lexical representations.

13. The computer-implemented method of claim 5, wherein determining that at least the portion of the first speech processing hypothesis corresponds to the correction information comprises:

comparing at least a portion of the plurality of speech processing hypotheses to at least a portion of entries in an error list comprising the correction information; and determining that at least the portion of the first speech processing hypothesis is equal to at least a portion of the correction information.

14. The computer-implemented method of claim 5, wherein the generating the one or more lexical representations comprises determining a plurality textual representations that correspond to the first semantic representation and do not correspond to the second semantic representation, wherein the one or more lexical representations comprise the plurality of textual representations.

15. The computer-implemented method of claim 5, further comprising determining to execute the second executable action instead of the first executable action based at least partly on the third semantic representation being generated using the second speech processing hypothesis instead of the first speech processing hypothesis.

16. The computer-implemented method of claim 5, wherein executing the second executable action comprises at least one of: generating a dialog response; initiating playback of an audio content item; setting a timer; or performing a search.

17. The computer-implemented method of claim 5, further comprising generating, subsequent to storing the correction information and prior to generating the third semantic representation of the third user utterance, a plurality of intervening semantic representations of intervening user utterances, wherein the plurality of intervening semantic representations are generated using the speech processing system and audio data regarding the intervening user utterances, and wherein the correction information is maintained throughout the generating the plurality of intervening semantic representations.

18. Non-transitory computer-readable storage comprising executable code that, when executed, causes one or more computing devices to perform a process for executing an action based on an utterance, the process comprising:

generating first speech processing results comprising a first semantic representation of at least a portion of a first user utterance, the first speech processing results generated using a speech processing system and audio data regarding at least the portion of the first user utterance;

determining that a second semantic representation of at least a portion of a second user utterance relates to a correction to the first semantic representation;

generating, using the first semantic representation, one or more lexical representations associated with a meaning corresponding to the first semantic representation;

storing correction information in an error list separate from the first speech processing results and separate from second speech processing results comprising the second semantic representation, wherein the correction information indicates that the one or more lexical representations are erroneous;

subsequent to storing the correction information and prior to generating a third semantic representation of a third user utterance, generating a plurality of intervening semantic representations of intervening user utterances, the plurality of intervening semantic representations generated using the speech processing system and audio data regarding the intervening user utterances;

determining, using the correction information, that at least a portion of a first speech processing hypothesis, of a plurality of speech processing hypotheses for the third user utterance, corresponds to a lexical representation of the one or more lexical representations;

removing the first speech processing hypothesis from the plurality of speech processing hypotheses based at least partly on the determining that at least the portion of the first speech processing hypothesis corresponds to the lexical representation;

generating the third semantic representation of at least a portion of the third user utterance using a second speech processing hypothesis of the plurality of speech processing hypotheses instead of the first speech processing hypothesis based at least partly on the second speech processing hypothesis remaining in the plurality of speech processing hypotheses after the first speech processing hypothesis is removed, wherein the first speech processing hypothesis is associated with a first executable action, and wherein the second speech processing hypotheses is associated with a second executable action distinct from the first executable action; and executing the second executable action.

19. The non-transitory computer-readable storage of claim 18, wherein the process further comprises maintaining the correction information in the error list for a period of time.

20. The non-transitory computer-readable storage of claim 18, wherein the generating the one or more lexical representations comprises expanding, using a natural language generation component, the first semantic representation into the one or more lexical representations.

21. The non-transitory computer-readable storage of claim 18, wherein determining that at least the portion of the first speech processing hypothesis corresponds to the correction information comprises:
  comparing at least a portion of the plurality of speech processing hypotheses to at least a portion of entries in an error list comprising the correction information; and
  determining that at least the portion of the first speech processing hypothesis is equal to at least a portion of the correction information.

22. The non-transitory computer-readable storage of claim 18, wherein the generating the one or more lexical representations comprises determining a plurality of textual representations that correspond to the first semantic representation and do not correspond to the second semantic representation, wherein the one or more lexical representations comprise plurality of textual representations.

* * * * *